United States Patent Office 3,482,560
Patented Dec. 9, 1969

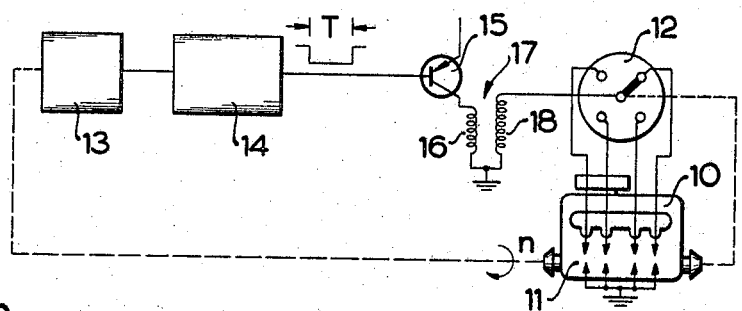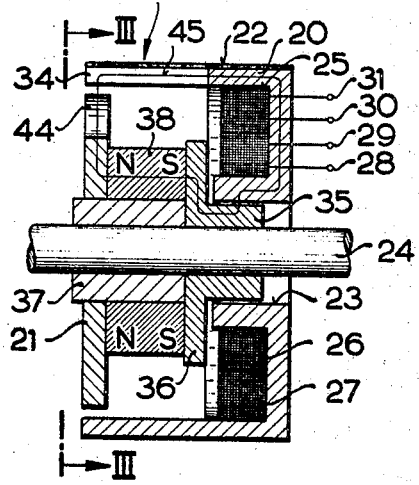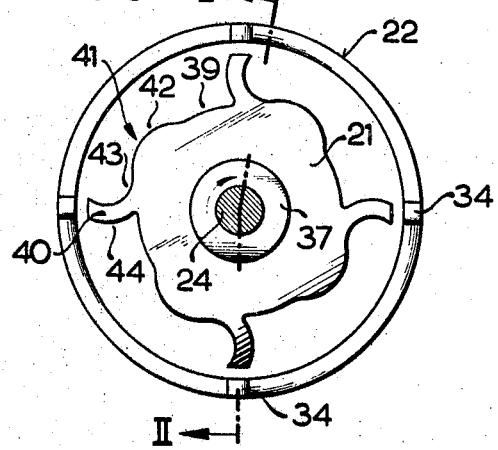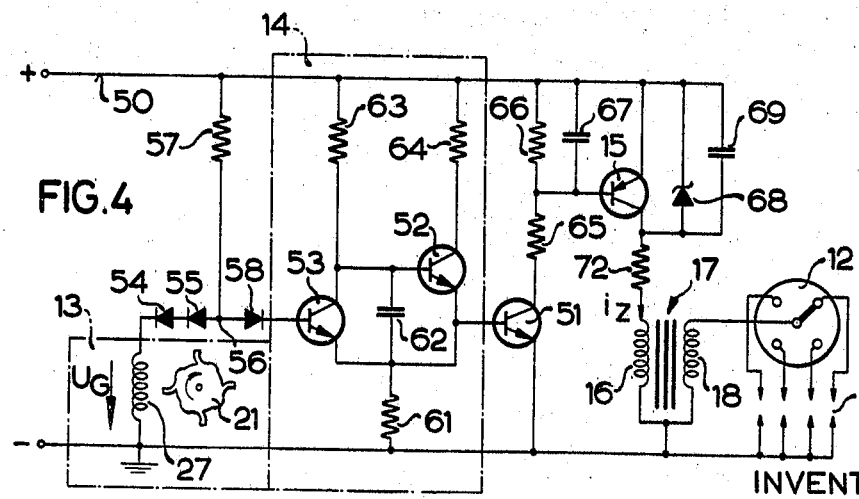

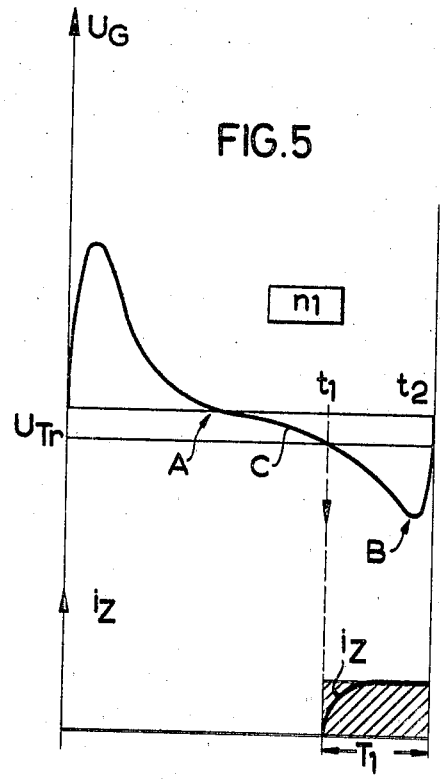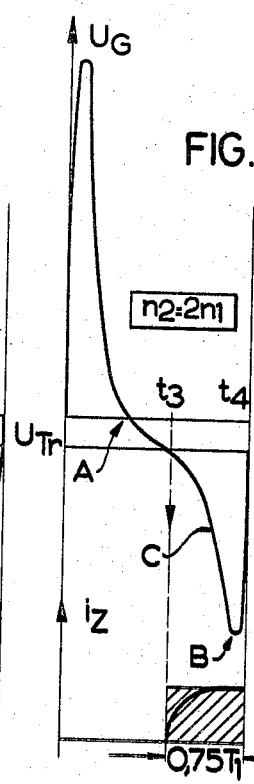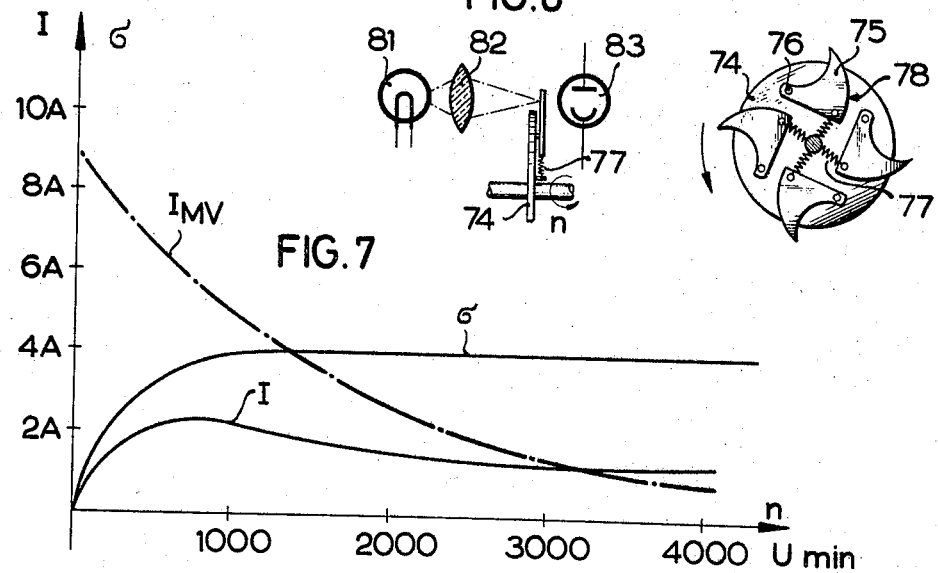

3,482,560
TRANSISTORIZED IGNITION SYSTEM FOR
INTERNAL COMBUSTION ENGINES
Gerd Höhne, Ludwigsburg, Germany, assignor to Robert
Bosch GmbH, Stuttgart, Germany, a limited liability
company of Germany
Filed Feb. 26, 1968, Ser. No. 708,015
Claims priority, application Germany, Mar. 23, 1967,
B 91,755
Int. Cl. F02p 3/00
U.S. Cl. 123—148                                        4 Claims

ABSTRACT OF THE DISCLOSURE

To cut current consumption of transistorized ignition systems at low engine speeds, a normally open electronic switch is controlled by a pulse source which includes a magnetic pulse generator providing pulses of a wave form which is approximately logarithmically gradually rising and then abruptly falling, to operate a voltage sensitive control network in such a manner that at least at the lower portion of the speed range of the engine, the turn-on point of the switch, during any ignition cycle, is advanced in dependence on engine speed.

---

The present invention relates to a transistorized ignition system, and more particularly to a contact-less pulse source, preferably an electromagnetic pulse generator, to control the switching transistor in the ignition circuit.

Transistorized, electronic ignition systems usually include an ignition coil, the primary of which is connected in series with an electronic semiconductor switch, which ordinarily is in non-conductive state. A control circuit is provided in order to control the conductivity of the transistor. The control circuit itself is activated by a contact-less pulse source rotating in synchronism with the rotation of the internal combustion engine, in order to cause the electronic switch to be cyclically operated.

The electronic switch is closed and current flows through the primary of the ignition coil. At the instant ignition is desired, the closed switch is opened which induces a high tension pulse in the secondary which is applied to the spark plugs, customarily over a distributor, in order to cause ignition of the fuel-air mixture in the internal combustion engine.

The control circuit for the switching transistor may be a monostable multivibrator which causes interruption of the current through the ignition coil when a pulse is received from the pulse source, thus causing an ignition pulse to fire the spark plug; after a certain, predetermined time, which is the recovery time of the monostable multivibrator, the power transistor controlling current through the primary is again caused to become conductive, thus passing current through the ignition coil, to be interrupted at the next cycle.

At high speeds of the engine, the number of ignition pulses per unit time must be high. For example, a four cylinder, four cycle engine running at 5,000 r.p.m. requires 160 ignition pulses per second. The multivibrator thus must have a very short pulse time, for example a millisecond, in order to provide such a high pulse rate with certainty. At low speeds, for example at 600 r.p.m., 20 ignition pulses per second will be necessary. The current through the primary winding of the ignition coil will thus be high, since the primary current will flow during 49 milliseconds, and will be interrupted only during one millisecond. This loads the vehicle battery substantially, particularly since the current through the primary winding in many customary transistor ignition systems is from between 8 and 10 a. This current thus causes rapid discharge of the battery if continued for an appreciable period of time.

Transistorized ignition arrangements have been proposed in which the current through the primary winding of the ignition coil is turned on only shortly before the ignition point, and turned off at the moment the ignition pulse is desired. A magnetic pulse source is provided, connected to the engine, which provides an alternating current voltage synchronized with the rotation of the engine. At low engine speeds, that is when the magnetic pulse source runs slowly, current is connected to the ignition coil long before the ignition time, and a strong ignition pulse is provided. When the pulse source, however, runs fast at high engine speeds, current is connected only shortly before the ignition time and the ignition impulse is weak. Ignition, thus, degrades with increased engine speed.

It is an object of the present invention to provide a transistorized ignition system, and particularly to provide a pulse source and control circuit for transistorized ignition systems in which the disadvantages of known transistorized ignition systems are avoided; and, in which the ignition energy increases with increasing speed of the engine in a low range of engine speed.

SUBJECT MATTER OF THE PRESENT INVENTION

The pulse source includes a pulse generator, preferably an electromagnetic pulse generator (but optical or other pulse generators are possible) which is so arranged that at least within a certain range of the speeds of the internal combustion engine, the connection time, within any cycle, of the primary of the ignition coil is advanced. In accordance with an embodiment of the invention, an electromagnetic pulse source is provided having a stator, and a rotor in a magnetic circuit which also includes an air gap. The reluctance of the magnetic path varies in dependence on the position of the rotor and the stator during any ignition cycle in such a manner that the reluctance decreases at first gradually, for example in accordance with a logarithmic function, and then abruptly increases to provide an output pulse having a voltage which is gradually rising and then abruptly cuts off. This output pulse is used to control a normally open voltage sensitive switch. The closing time of the switch is determined by increase of the voltage of the pulse above a certain predetermined threshold potential.

The arrangement, in accordance with the present invention, is particularly necessary for operation at low speeds. In this speed range the engine generator does not provide sufficient current for ignition, so that energy is taken out of the battery. The present invention thus provides a system which relieves loading of the battery, since the energy requirements of ignition, at low engine speeds, increase approximately proportionally with engine speed. To ensure positive ignition already at very low speeds, for example upon starting, certain special forms of the pulse source are desirable which will be described in connection with a specific example.

The structure, organization, and operation of the invention will now be described more specifically with reference to the accompanying drawings, wherein:

FIG. 1 is an overall block diagram of an ignition system in accordance with the present invention;

FIG. 2 is a cross-sectional view through a magnetic pulse source for a 4-cylinder, 4-cycle engine on lines II—II of FIG. 3;

FIG. 3 is a front view of the magnetic pulse source along lines III—III of FIG. 2;

FIG. 4 is a circuit diagram of the ignition system in accordance with the invention;

FIGS. 5 and 6 are graphs to illustrate the operation of the invention of FIGS. 2 to 4;

FIG. 7 is a graph comparing the energy requirements of an ignition system in accordance with the invention with a multivibrator-transistorized ignition, in dependence on motor speed;

FIG. 8 is a schematic showing of another example of the present invention; and

FIG. 9 is a schematic plan view of a shutter in the embodiment of FIG. 8.

Referring now to the drawings and particularly to FIG. 1: A 4-stroke 4-cylinder engine 10 is provided with four spark plugs 11, connected over a distributor 12 to be supplied with ignition pulses from an ignition coil 17 having primary winding 16 and secondary winding 18. The distributor is drive at engine speed $n$, for example from the cam shaft, in indicated by the broken line.

A pulse source 13 controls a control circuit 14 which provides pulses having a duration T. It is desirable that the pulse duration T is substantially independent of the speed $n$ of the engine. Pulse source 13 is, like the distributor, driven at speed $n$ and may be constructed as an assembly common with the distributor.

Pulses T control an electronic switch 15 which, as shown, is usually a power transistor. Short-period pulses applied over primary 16 cause, upon sudden interruption of the curent through the primary winding, a high tension pulse at the secondary 18 which is applied to the particular spark plug connected by means of the distributor 12.

FIGS. 2 and 3 ilustrate a pulse source which provides pulses to trigger a monostable multivibrator, in the form of a Schmitt circuit, the duration of the pulses of which is substantially independent of the speed $n$. This is achieved in essence by the particular wave form of the voltage obtained from the pulse source 13 which, in turn, is the result of a particular construction of the air gap in a magnetic circuit, as best seen in FIG. 3. A fixed part, stator 20 forms, together with a rotor 21, a magnetic circuit. Stator 20 has a cylindrical outer surface 22, and a cylindrical bore 23 through which a drive shaft 24 passes, which also forms the axis of the rotor. Stator 20 is formed with a circular, ring-shaped space 25 in which a pair of windings 26, 27 are placed. Winding 26 is a field coil which may not be necessary. It may be used, for example, to compensate for variations in operating voltage. Winding 27 is an induction winding. The four terminals 28, and 29, 30, 31 of both windings are caried outside of the pulse source assembly. As particularly seen in FIG. 3, the cylindrical outer surface 22 is continued to form four poles 34 of approximately rectangular cross-section, offset with respect to each other by 90 degrees.

A hollow, cylindrical element 35 is secured to shaft 24. The outer diameter of element 35 is only a little smaller than the diameter of bore 23, and extends thereinto. Beyond bore 23, part 35 extends radially to form a flange 36. The second, cylindrical part 37, of non-magnetic material seats against the part 35 and flange 36. A hollow cylindrical permanent magnet 38 surrounds the nonmagnetic part 37 and is thus concentric with shaft 24.

One face, indicated as the north pole N of magnet 38, bears against a rotor pole piece 21, the particular shape of which is best seen in FIG. 3. The air gap between poles 34 and the rotor pole piece 21 thus depends upon the angular position of the rotor within the stator.

The shape of the rotor is determined by the wave form to be desired from the electromagnetic pulse source and is best determined, essentially, by experiments. The diameter of the magnetic pulse generator is usually small, in the range of from 6 to 9 cm., since it is usually assembled together with the distributor in order to save space in the engine compartment. The leakage flux is thus rather substantial and mathematical determination thereof is practically impossible. For pulse sources of larger diameters, different forms of the rotor may result, since leakage flux has a lesser influence on large diameter rotors.

Rotor 21 is shaped to have depressions 39 and rises 40 at its circumference, the depressions and rises merging into each other. If the rotor 21 is rotated in the direction indicated in FIG. 3 with the arrow, leading edge 41 of rise 40 approaches a pole 34. Edge 41 is approximately S-shaped. A first portion 42 of the S, which merges with a depression 39 is rounded and roughly concentric to the drive shaft 24. The adjacent portion 43 of the S is approximately perpendicular to the drive shaft 24 and is shaped to form a curved strip, having a curvature counter in the direction of rotation. The other edge, that is the trailing edeg 44 of the rise 40, has a very steep slope, approximately in the shape of an undercut saw tooth, and merges with the depression 39. The portion 43 of the leading edge extends, as best seen in FIG. 3, somewhat over half of the distance between two adjacent rises 40.

Permanent magnet 38 is axially polarized, as indicated by the poles N and S in FIG. 2. It forms the magnetic circuit which also includes stator 20 and rotor 21, and provides a magnetic flux as indicated by the flux line 45 (FIG. 2). The flux depends on the angular position of rotor 21 with respect to the stator 20, that is on the reluctance of the entire magnetic path including the air gap. If rotor 21 is turned from the position shown in FIG. 3 in the direction of the arrow, poles 34 will be opposite depressions 39. There will be a large air gap between stator and rotor, and the magnetic flux cutting induction winding 27 will be small.

Rotation of rotor 21 causes changes in flux, which induce a voltage $u_G$ in induction winding 27. The wave shape of this voltage is seen in the upper portion of FIGS. 5 and 6, the particular form and shape of the wave being given by the shape of rotor 21, and the absolute amplitude by the reluctance of the magnetic path, the number of turns of winding 27 and the speed of rotation. The amplitude of potential $u_G$ is proportional to the speed $n$, if armature reaction and eddy currents are neglected. FIG. 5 illustrates voltage $u_G$ for a low speed $n_1$; FIG. 6 for approximately twice the speed $n_2$.

The portion of the voltage curve $u_G$ of particular interest in the present invention is that region which begins at the zero crossover point A (FIGS. 5, 6) and extends to the negative maximum B. This portion is indicated with C, and is of approximately hyperbolic shape. The significance of this particular characteristic will become apparent in connection with the discussion of the circuit of FIG. 4.

Referring now to FIG. 4, which illustrates a circuit diagram of an ignition system designed to cooperate with the pulse source of FIGS. 2 and 3. Parts previously described have been given the same reference numerals and will not be referred to in detail again.

The circuit of FIG. 4 is connected to a battery, not shown, of about 12 v., which connects to a positive bus 50, and to a negative line connected to chassis.

Transistor 15 is a pnp power transistor. An amplifier npn transistor 51 is connected thereto which, in turn, is connected to the output of the control circuit 14. Control circuit 14 has two npn transistors 52, 53, connected to form a voltage sensitive flip-flop circuit.

Induction winding 27 is connected to chassis with one of its terminals; its other terminal connects to the cathode of a diode 54, the anode of which is connected over a series diode 55 to a junction 56. A high resistance 57 of, for example, 100K ohms connects from junction 56 to positive bus 50. The input resistance of the circuit is thus high, so that the pulse source 13 is only lightly loaded.

The anode of a diode 58 is connected to junction 56; its cathode connects to the base of transistor 53. Transistor 53, as well as diodes 54, 55, are preferably silicon transistors in order to substantially compensate for effects of temperature variation.

The emitters of transistors 52, 53 are connected together and, over a resistance 61 with chassis. The junction of the emitters is further connected to the base of transistor 51 and with one electrode of a condenser 62. The other electrode of condenser 62 connects to the base of transistor 52 and to the collector of transistor 53. The collector of transistor 53 is further connected over a collector resistance 63 with positive bus 50. The collector of transistor 52 is connected over a collector resistance 64 with positive bus 50. The emitter of transistor 51 is connected to chassis. Its collector is connected over a resistance 65 to the base of power transistor 15 and over a parallel circuit formed of resistance 66 and condenser 67 to positive bus 50.

A Zener diode 68 is provided in order to protect the emitter-collector path of transistor 15 against destructive voltage peaks. A condenser 69 is connected in parallel to Zener diode 68. The collector of transistor 15 is connected over a current limiting resistance 72 to the primary winding 16 of ignition coil 17. The other terminal of primary winding 16 is connected to chassis. One terminal of secondary winding 18 likewise connects to chassis, the other one connecting to the distributor arm of distributor 12.

Transistors 52 and 53 together form a voltage-sensitive flip-flop circuit having a common feedback resistance 61. When no negative voltage is induced in winding 27, transistor 53 conducts, and transistors 52, 51 and 15 are thus blocked. There will be no current through primary winding 16 when the engine is stopped and the entire circuit is in quiescent condition.

If a negative voltage is applied to the base of transistor 53 which exceeds the value of $U_{Tr}$ as seen, for example, in the upper portion of FIG. 5, transistor 53 will block, and transistors 52, 51 and 15 become conductive. As soon as the voltage $U_{Tr}$ is removed, transistor 53 again becomes conductive, blocking transistors 52, 51 and 15 and thus interrupting current $i_Z$ through primary winding 16. An ignition impulse to cause a spark at spark plugs 11 results.

As best seen in the upper graph of FIG. 5, the voltage $U_{Tr}$ is exceeded at time $t_1$, if the engine has a speed $n_1$. The voltage disappears again at time $t_2$. Transistor 15 is conductive in the time interval between $t_1$ and $t_2$, and an ignition pulse is provided at time $t_2$. The current through the primary winding 16, $i_Z$, is indicated in the lower graph of FIG. 5.

FIG. 6 illustrates the relationship of currents and voltages at a speed $n_2$, which is approximately twice the speed of $n_1$. Voltage $U_{Tr}$ is exceeded (in absolute value) at time $t_3$ and intersected again at time $t_4$. Current $i_Z$ again flows through primary winding in the interval between $t_3$ and $t_4$, and the ignition pulse occurs at time $t_4$.

It will immediately be seen from a comparison of FIGS. 5 and 6, that the current $i_Z$, in FIG. 1, flows during an interval $T_1$; in FIG. 6, during an interval of $0.75 \cdot T_1$. Doubling the speed thus decreases the period of time of current flow by only 25 percent.

The ignition energy for each ignition cycle can be made to be substantially constant within a wide region of speed ranges by suitable shape of the region C of the voltage curve $u_G$; the load placed on the battery to supply ignition power will thus increase approximately proportionately to the number of ignition pulses provided.

The time of ignition, within any one cycle, varies only slightly due to the particular shape of the trailing edge 44. Any variation can be easily compensated by known means, such as vacuum or centrifugal compensation of the position of the pulse source 13, such compensation not being shown for simplicity. Additionally, change of current through the field winding 26 can achieve a similar result.

FIG. 7 illustrates experimental measured curves relating the average current I, forming the time-average of all currents $i_Z$, as a function of motor speed $n$. Further, the angle $\sigma$ of closing of the contact within any one cycle, as a function of speed is indicated. The chain-dotted curve $I_{MV}$ illustrates current consumption utilizing an ignition system according to the prior art and having a multivibrator controlling a power transistor. The highest current is used at zero speed, since current constantly flows through the primary of the ignition coil. This current decreases with increase of engine speed. Curve I illustrates the current in accordance with the present invention. At zero speed, current is equal to zero since the transistor 15 is nonconductive. With increased speed of the engine, the current rises rapidly. This ensures positive ignition even at low speeds, for example upon starting. At about 2000 r.p.m., this current remains substantially constant and eventually coincides with the curve $I_{MV}$.

The strip-shaped rises 40 of rotor 21 are provided in order to generate a voltage $u_G$ which is larger than voltage $U_{Tr}$ at all times, in order to ensure ignition even at low speeds.

Angle $\sigma$ is only illustrated for an ignition system in accordance with the present invention. If the full angle between a pair of pulses is 90 degrees, then $\sigma$ is a measure of the current flow between a pair of subsequent cycles of ignition, that is flow of current $i_Z$ for, for example, 40 degrees. This current flow, that is conduction of transistor 15, is substantially constant in a speed range of above 1000 r.p.m. The shape of rotor 21 is thus primarily effective at low speeds of the engine 10.

FIGS. 8 and 9 illustrate a different form of the solution to the problem of positive transistorized ignition, in accordance with the present invention, and operating photoelectrically. A shutter disk 74, driven at speed $n$ from the engine, has four specially shaped elements 75 on its circumference, journalled at a point 76 at disk 74 and resiliently pulled centrally by a spring 77, each. Elements 75 have an edge 78 concentric with journal point 76. The shape of this edge determines, as will be seen, the time of ignition.

Elements 75 extend beyond the edge of disk 74, more or less, depending on the speed of the engine 10, due to the centrifugal force applied against the force of springs 77. They periodically pass through the light beam of an optical system formed of a lamp 81, a lens 82, and a photocell 83. Light from lamp 81 is concentrated on cell 83 by lens 82. Cell 83 is so connected that current will flow in the primary 16 of ignition coil 17 only when photocell 83 is not illuminated, that is when one of the elements 75 interrupts the path of light from lamp 81. This occurs four times during each rotation of disk 74.

At low speeds, elements 75 are pulled centrally by springs 77, and interrupt the light only during a short period of time during any subsequent ignition pulses. As the speed increases, elements 75 extend beyond the circumference of disk 74 more and more, due to centrifugal force, and interrupt the light for longer periods. The time during which current flows through the ignition coil can be made to be essentially constant by suitably shaping elements 75 and selecting the strength of springs 77. The shape of edge 78 of elements 75 can also be selected to affect ignition timing within any one cycle.

The invention is not limited to the examples illustrated and described in detail. It is, of course, also possible to provide electromagnetic pulse sources having resistances which depend on a magnetic field, and which provide pulses, the duration of which is substantially independent of speed of the driving engine. The arrangement with an inductive pulse source is, however, particularly advantageous, because no ignition current need flow at any time when the pulse source is not driven. It is also substantially insensitive against spurious voltages. If, for example, a spurious voltage is applied to the control circuit 14 during a short period, such as a few microseconds, then this will have no influence on the ignition because, during this time, an insufficient magnetic field can build up within ignition coil 17, as required to obtain a spark from the spark plugs. Such a short-time connection does not result in an ignition spark—contrary to the ignition of a multivibrator-type transistorized ignition system. Misfire is thus effectively avoided. This arrangement also enables a high-impedance input to the circuit, which has the advantages above referred to and particularly of low loading on the pulse source.

The present invention has been described in connection with a 4-cylinder, 4-cycle engine. Other arrangements are of course possible and changes and modifications, as determined by the requirements of particular applications or uses may be made without departing from the inventive concept.

I claim:

1. In a magnetic signal generator for use with an electronically controlled ignition system of an internal combustion engine having a voltage sensitvie control circuit adapted to control the ON-time of a semiconductor switch connected in series with the primary of the ignition coil in dependence upon the magnitude of the output voltage of the signal generator, said signal generator having a stator, a rotor adapted to be driven by said internal combustion engine and separated from said stator by an air gap and an output winding mounted on said stator, the improvement wherein said rotor is formed with a plurality of rises (40) and depressions (39) facing said air gap and corresponding to the number of cylinders of the engine (10), the leading edge (41) of the rises having an approximately S-shaped profile.

2. Apparatus according to claim 1 wherein a first portion (42) of said S-shaped profile and forming the leading edge (41) of said rotor is approximately concentric with the axis of rotation (24) of said rotor (21) and the remaining portion (43) of said S-shaped profile, forming the trailing edge, is approximately perpendicular to said axis.

3. Apparatus according to claim 2 wherein the remaining portion (43) of said S-shaped profile is shaped to provide a strip (40, 44) extending approximately perpendicular to the axis of rotation (24) of said rotor (21) and curved counter the direction of rotation of the rotor.

4. Apparatus according to claim 1 wherein the leading edge (41) of the rises is shaped to provide for approximately logarithmic change in flux across the air gap during rotation of the rotor (21) in the stator (20).

References Cited

UNITED STATES PATENTS

| | | |
|---|---|---|
| 3,020,897 | 2/1962 | Sekine et al. |
| 3,073,879 | 1/1963 | Straub. |
| 3,202,146 | 8/1965 | Short et al. |
| 3,322,107 | 5/1967 | Mieras et al. |

LAURENCE M. GOODRIDGE, Primary Examiner

U.S. Cl. X.R.

315—209